US005325667A

United States Patent [19]

Lundbäck

[11] Patent Number: 5,325,667

[45] Date of Patent: Jul. 5, 1994

[54] MACHINE FOR TRANSFORMING PRESSURE OR POTENTIAL ENERGY OF A FLUID INTO MECHANICAL WORK

[75] Inventor: Stig Lundbäck, Vaxholm, Sweden

[73] Assignee: Humanteknik AB, Stockholm, Sweden

[21] Appl. No.: 23,134

[22] Filed: Feb. 24, 1993

Related U.S. Application Data

[63] Continuation of Ser. No. 906,050, Jun. 26, 1992, abandoned, which is a continuation of Ser. No. 689,865, Jun. 5, 1991, abandoned.

[30] Foreign Application Priority Data

Dec. 8, 1988 [SE] Sweden .............................. 8804449-0

[51] Int. Cl.$^5$ ........................ F16D 31/02; F01L 15/18
[52] U.S. Cl. ........................................ 60/398; 91/328
[58] Field of Search .................. 60/398; 417/330, 150; 91/370, 328, 50; 290/53

[56] References Cited

U.S. PATENT DOCUMENTS

| | | | |
|---|---|---|---|
| 3,039,272 | 6/1962 | Frick | 91/50 X |
| 3,989,951 | 11/1976 | Lesster et al. | 417/330 X |
| 4,086,036 | 4/1978 | Hagen et al. | 92/99 X |
| 4,103,490 | 8/1978 | Gorlov | 60/398 |
| 4,226,573 | 10/1980 | Reid | 60/398 X |

FOREIGN PATENT DOCUMENTS

| | | | |
|---|---|---|---|
| 875142 | 4/1953 | Fed. Rep. of Germany . | |
| 879637 | 3/1943 | France . | |
| 1048503 | 12/1993 | France . | |
| 6850 | 1/1977 | Japan | 290/53 |
| 0249674 | 12/1985 | Japan | 290/53 |
| 2110764 | 6/1983 | United Kingdom | 290/53 |

*Primary Examiner*—Edward K. Look
*Assistant Examiner*—John Ryznic
*Attorney, Agent, or Firm*—White & Case

[57] ABSTRACT

A machine for converting pressure energy of a fluid into mechanical work comprises a working chamber (27, 28) the volume of which is cyclically variable in response to reciprocatory motion of a wall (20) which defines the working chamber; a reciprocatory power member (15, 16) which is displaceable by said wall (20) under action of the pressure fluid of the wall during expansion of the working chamber (27, 28); an inlet conduit (12) communicating with the working chamber, an outlet circuit (13) communicating with the working chamber, an outlet valve (22) which is closable to prevent fluid flow in the outlet conduit in the direction away from the working chamber, and a driven member (17) operatively connected with the power member. The outlet conduit comprises a gap-like passage which substantially surrounds the working chamber (27,28) and extends along the periphery thereof and which is open or openable to permit fluid flow therethrough from the working chamber substantially without any pressure drop.

2 Claims, 1 Drawing Sheet

MACHINE FOR TRANSFORMING PRESSURE OR POTENTIAL ENERGY OF A FLUID INTO MECHANICAL WORK

This application is a continuation of application Ser. No. 07/906,050, filed on Jun. 26, 1992 which is a continuation of Ser. No. 07/689,865 (abandoned) filed Jun. 5, 1991.

This invention relates to a machine for transforming pressure or potential energy of a fluid into mechanical work. More particularly, the invention relates to a machine of the kind defined in the preamble of the independent claim.

The machine according to the invention is primarily intended for use as a hydraulic motor, particularly as a drive for an electric generator, using a water supply of low height of drop. However, it is also useful with a gaseous working fluid, especially air.

An object of the invention is to provide a machine by means of which hydrostatic or gas pressure of low magnitude can be transformed with low loss of energy into motion of a driven or output member, such as a shaft A demand for such a . machine exists, for example, where it is desired to utilize water wave motion, tidal water, or flowing water with low height of drop for the production of electric energy.

To this end, the machine according to the invention is constructed as set forth in the independent claim.

Because of this construction of the machine according to the invention, the inlet passage can readily be configured such that it can be opened to present a very large cross-sectional area to the flow of the working fluid, whereby the working chamber can be filled very rapidly through the passage substantially without any pressure drop and consequent loss of energy. The construction of the machine according to the invention also offers the possibility of providing a configuration of the flow-through path of the machine which promotes smooth, low-loss flow of the working fluid through the machine.

The invention is illustrated in the accompanying drawing which comprises diagrammatic representations of an exemplary embodiment to be described below.

Figure 1:
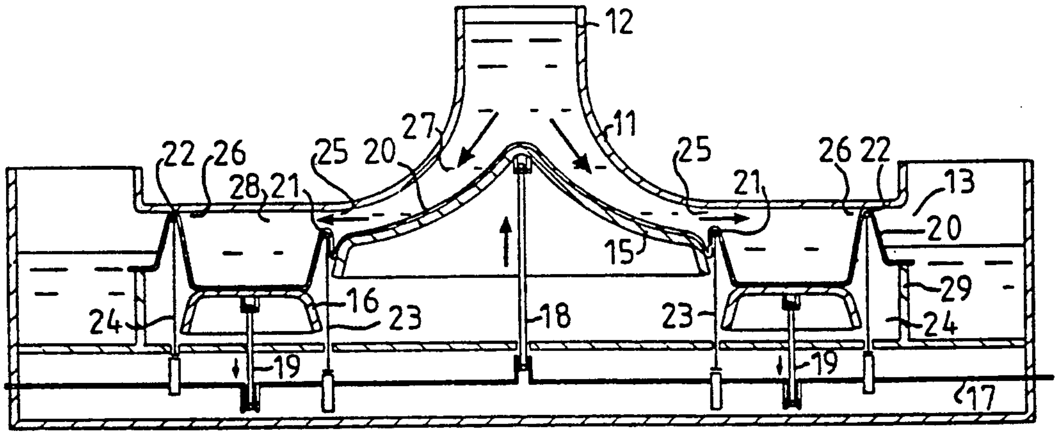
Figure 2:
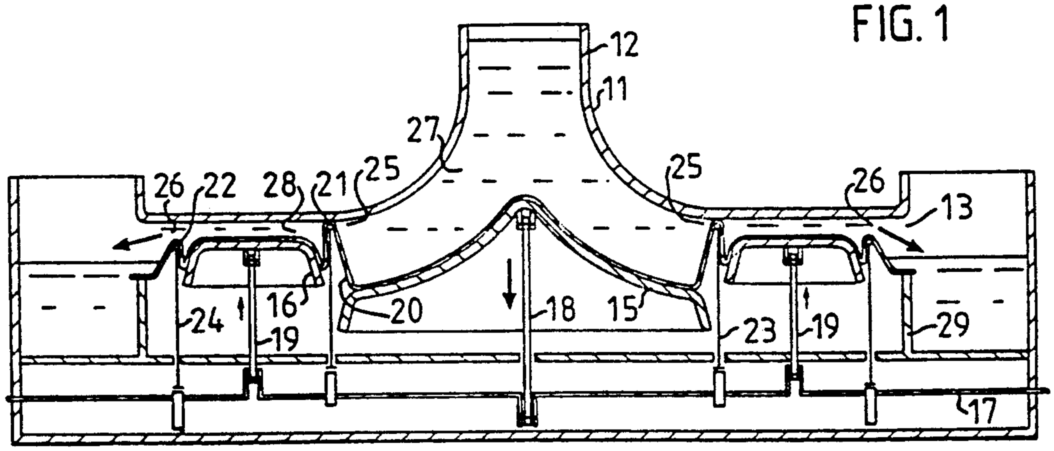

FIGS. 1 and 2 of the drawing show a central vertical section of a machine according to the invention in two different positions or phases of a work cycle.

In the illustrated embodiment, which is a hydraulic motor, the machine comprises a fixed or stationary top portion, generally designated by 11, which has a central inlet for liquid (water), a base portion including a plurality of movable parts which transform the hydrostatic or head pressure of the incoming liquid into a rotary motion of a driven or output member. An outlet for the liquid is defined between the base portion and the underside of the top portion.

The top portion 11 defines the tubular inlet 12 for liquid—water for practical purposes—which constantly fills the inlet up to a certain level. Below the circular circumferential outer edge of the top portion the outlet 13 is located generally laterally of a working chamber to be described.

The base portion includes a power member comprising two vertically movable parts, namely, a central or inner part 15 of circular shape in plan view, and an annular outer part 16 which is concentric with the inner part. Through connecting rods 18 and 19, the two power member parts 15 and 16 are connected to an output or driven member in the form of a crankshaft 17 which is connected with a generator or other machine (not shown) to be driven.

Positioned over the two power member parts 15 and 16 is a fluid-tight very flexible film or sheet 20 which is sealingly attached to a stationary wall 29 in the base portion and bridges the interspace between this wall and the outer power member part 16 and also bridges the interspace between this part 16 and the inner power member part 15.

Beneath the sheet 20, the just-mentioned interspaces accommodate valves in the form of a pair of vertically movable thrust rings, namely, an inner thrust ring 21 and an outer thrust ring 22, which are moved up and down by motion transmitting mechanisms 23 and 24, respectively, such as radial cams secured to the crankshaft 17, in step with the motion of the power member parts 15 and 16. During their upward movement, the thrust rings 21, 22 cause the sheet 20 to engage the top portion 11 so as to close circumferentially extending, continuous, gap-like flow passages 25 and 26, respectively, and thereby prevent liquid flow through the passages.

The space which is radially inwardly of the outer thrust ring 22 and the flow passage 26 and which is limited in the upward direction by the top portion 11 and limited in the downward direction by the sheet 20 constitutes a working chamber comprising an inner compartment or portion 27, the horizontal extension of which corresponds that of to the circular space within the inner thrust ring 21, and an annular outer compartment or portion 28, the horizontal extension of which corresponds to that of the annular space between the two thrust rings 21 and 22. The surface area of the inner working chamber portion 27 is about half the surface area of the outer portion 28.

The operation of the machine is as follows:

In the phase of the work cycle shown in FIG. 1, the inner thrust ring 21 is in a lowered position so that the annular passage 25 between the working chamber portion 27 and the working chamber portion 28 is fully open, while the outer thrust ring 22 is in an elevated position to keep the annular passage between the outer working chamber portion 28 and the outlet 13 closed.

Under gravity action or action of the pressure of the water in the outer working chamber portion 28 the outer power member part 16 is moving downwardly so that it applies a torque to the crankshaft 17. At the same time, the inner power member part 15 is being pushed upwardly by the crankshaft, thereby lifting the water in the inner working chamber portion 27 so that the water therein can flow through the passage 25 into the outer working chamber portion 28. At the same time, an equal quantity of additional water is supplied direct from the inlet 12 to the outer working chamber portion 28.

The horizontal surface area over which the weight or pressure of the water in the working chamber portion 28 acts on the outer power member part 16 is significantly larger than (twice as large as) the horizontal surface area over which the weight or pressure of the water in the inner working chamber portion 27 acts on the inner power member part 15. Thence, the torque applied to the crankshaft 17 by the power member part 16 is significantly greater than the torque required to move the power member part 15 upwardly. The torque difference may be extracted as useful work from the crankshaft 17.

When the outer power member part 16 has reached its lowermost or lower dead-centre position and the inner power member part 15 has reached its topmost or top dead-centre position, the inner thrust ring 21 is moved to an elevated position to close the passage 25, while the outer thrust ring 22 is moved to a lowered position to open the passage 26 (see FIG. 2) so that the water in the outer working chamber portion 28 can flow freely through the outlet 13, this flow being substantially horizontal.

The inner power member part 15 is still being acted on by the fluid pressure in the inlet 12, while on account of the closing of the passage 25 the outer part 16 is being acted on by the pressure corresponding to the weight or height of the column of water supported by that part. Through its connecting rod 18 the inner part 15 thereby applies to the crankshaft 17 a torque which is opposed, although only to a small degree, in that the crankshaft 17 and the connecting rod 19 cause the outer power member part 16 to be pushed upwardly and thereby to reduce the volume of the outer working chamber portion 28. The large excess or differential torque is transformed by the crankshaft 17 into useful work in the machine being driven. If necessary, the inertia of the moving system may be increased, e.g. by a flywheel secured to the crankshaft, to smooth the operation and ensure movement of the power member parts past their dead-centre positions.

When the power member part 16 has reached its top dead-centre position and the power member part 15 has reached its lower dead-centre position, the positions of the thrust rings 21, 22 are reversed, whereupon the first-described phase of the work cycle is repeated.

Naturally, the invention is in no way limited to the embodiment shown by way of example. Thus, several modifications may be made within the scope of the invention. For example, the inner power member part, which is circular as shown in the drawing, may be annular like the outer part, and the inlet may then likewise be annular. Especially if the machine operates at very low pressure, it may be advantageous to divide the power member into more than two annular parts which operate with a phase difference between one another which is correlated to the number of parts, so that transformation into mechanical work is effected in more than two stages. In such case, a valve corresponding to the valve 21 of the illustrated embodiment is provided between adjacent power member parts or stages. Because each such valve, except the last one, also constitutes both an outlet valve of the next inner stage and an outlet valve of the next outer stage, an increase of the number of stages does not require more than one additional valve for each additional stage.

As is readily appreciated, the circumferential extension or length of the valved passages increases with increasing distance of the passages from the centre of the machine, and, consequently, the cross-sectional flow area over which the passages can be opened with a certain given vertical valve displacement is also increased with increasing distance of the passages from the centre. Corresponding considerations apply to the horizontal surface area of the chamber-defining surfaces of the power member parts, whereby the power members may accommodate an increased volume of liquid without an increase of their radial widths being necessary. Accordingly, the time required for the transfer of the liquid from one stage to the next is very short, even though the radially outer stages may have to accommodate very large volumes of liquid.

It should also be emphasized that it is basically possible for the transformation to take place in a single stage, even though this may mean undesired losses and strong pulsation of the extracted mechanical work. Such single-stage transformation may be achieved with the machine illustrated in the drawing by arresting one power member part, e.g. the inner part 15, at the top dead-centre position or any other suitable position, so that only the other part operates, or by connecting both parts to the crankshaft such that they operate in unison (parallel motion). Although in such case it is advantageous to provide the inlet 12 with a valve which prevents direct flow from the inlet to the outlet when the outlet valve is open, this is not absolutely necessary, because as a consequence of the large cross-sectional area presented to the flow through the outlet valve, the discharge from the working chamber takes place so rapidly when the outlet valve is fully open that the supply through the inlet only suffices for partial replenishment of the working chamber during the open phase of the outlet valve.

Other modifications are also possible. For example, instead of having a flexible sheet partially or entirely defining the wall of the working chamber, the working chamber walls may be rigid, being formed of relatively movable piston and cylinder surfaces. Moreover, it is obvious that the output or driven member need not be a crankshaft; it is conceivable to use a driven member which is displaced linearly or in any other way, such as a system of hydraulic pistons.

I claim:

1. A machine for transforming pressure or potential energy of a fluid into mechanical work, comprising

- a working chamber (27,28) the volume of which is cyclically variable in response to reciprocatory motion of a wall (20) which partially defines the working chamber,
- a reciprocatory power member (15,16) which is displaceable by said wall under action of the pressure of the fluid on the wall during expansion of the working chamber,
- an inlet conduit (12) communicating with the working chamber,
- an outlet conduit (13) communicating with the working chamber,
- an outlet valve (22) which is closable to prevent fluid flow in the outlet conduit int he direction away from the working chamber, and
- a driven member (17) operatively connected with the power member (15,16), characterized in that the outlet conduit (13) comprises a gap-like passage (26) which substantially surrounds the working chamber (27,28) and extends along the periphery thereof and which is openable by means of the outlet valve (22) to permit fluid flow therethrough from the working chamber substantially without any pressure drop, and further characterized by a second valve (21) which is disposed in a circumferentially extending gap-like passage (25) between radially inner (27) and radially outer (28) portions of the working chamber and which is openable by means of the second valve (21) to permit fluid flow between the inner and outer portions of the working chamber substantially without any pressure drop.

2. A machine according to claim 1, characterised in that the power member comprises at least two power member parts (15,16) which are movable with a phase difference between one another and one of which is disposed radially outside the other, the radially outer power member part (16) being positioned vertically opposite the radially outer working chamber portion (28) and the radially inner power member part (15) being positioned vertically opposite the radially inner working chamber portion (27).

* * * * *